United States Patent [19]

Semasa et al.

[11] Patent Number: 5,063,587
[45] Date of Patent: Nov. 5, 1991

[54] TRANSMISSION SYSTEM FOR STILL-PICTURE TV TELEPHONE

[75] Inventors: Takayoshi Semasa; Yutaka Ueno, both of Kamakura, Japan

[73] Assignee: Mitsubishi Denki Kabushiki Kaisha, Tokyo, Japan

[21] Appl. No.: 500,890

[22] Filed: Mar. 29, 1990

[30] Foreign Application Priority Data

Mar. 30, 1989 [JP] Japan .................................. 1-79676

[51] Int. Cl.⁵ .......................................... H04M 11/00
[52] U.S. Cl. ........................................ 379/53; 379/96; 358/85
[58] Field of Search ................. 379/53, 54, 93, 96–98; 358/85

[56] References Cited

U.S. PATENT DOCUMENTS

| | | |
|---|---|---|
| 3,517,117 | 6/1970 | Woodbury . |
| 4,258,387 | 3/1981 | Lemelson et al. . |
| 4,485,400 | 11/1984 | Lemelson et al. . |
| 4,715,059 | 12/1987 | Cooper-Hart et al. ................ 379/53 |
| 4,739,413 | 4/1988 | Meyer . |
| 4,849,811 | 7/1989 | Kleinerman ............................ 379/98 |
| 4,918,718 | 4/1990 | Emmons et al. ...................... 379/53 |

FOREIGN PATENT DOCUMENTS

0244260 11/1987 European Pat. Off. ................ 379/53

Primary Examiner—James L. Dwyer
Assistant Examiner—Wing F. Chan

[57] ABSTRACT

A still-picture TV telephone system for transmitting and receiving, via a telephone circuit, a still picture taken by a camera; a picture signal stored in a memory is modulated in phase and amplitude digitally and is offered or supplied to the telephone circuit during talking in voice. To superposing the talk in voice also during offering of the picture signal, the voice and picture signals are divided by frequency band. The frequency band of the voice signal is partially restricted, and the picture signal is inserted in the omitted band, during which time the picture signal is restricted in band by setting the band rate frequency to be lower than the carrier signal frequency when modulating the phase and amplitude. The picture signal is further restricted in band by a low-pass filter so that the voice and picture signals are separated by band so as not to overlap each other at the same frequency band.

14 Claims, 11 Drawing Sheets

TRANSMISSION SYSTEM FOR STILL-PICTURE TV TELEPHONE

BACKGROUND OF THE INVENTION

1. Field of the invention

This invention relates to a still-picture TV telephone system, and more particularly to a still-picture TV telephone system in which a still picture signal taken by a TV camera is modulated in phase and amplitude as a signal of voice band and is sent to a telephone circuit during talking over telephone.

2. Description of the Related Art

A TV telephone has been cherished in which a voice and a picture are transmitted simultaneously via a telephone communication circuit. As a matter of fact, however, with the existing telephone communication circuit, a moving picture requiring massive data is difficult to transmit and receive continuously. To this end, a still-picture TV telephone has been developed in which a still picture is transmitted to the other end of the line during talking.

Heretofore, in this type of still-picture TV telephone, it is possible to send a desired still picture or image (hereinafter called "picture"), e.g., a photograph or picture showing the speaker's face and message while the telephone communication is temporarily being stopped during taking in voice ordinarily.

According to this still-picture TV telephone, a picture can be transmitted and received via the telephone circuit, and an advanced telephone communication sending not only voice but visual information.

Figure 5A:
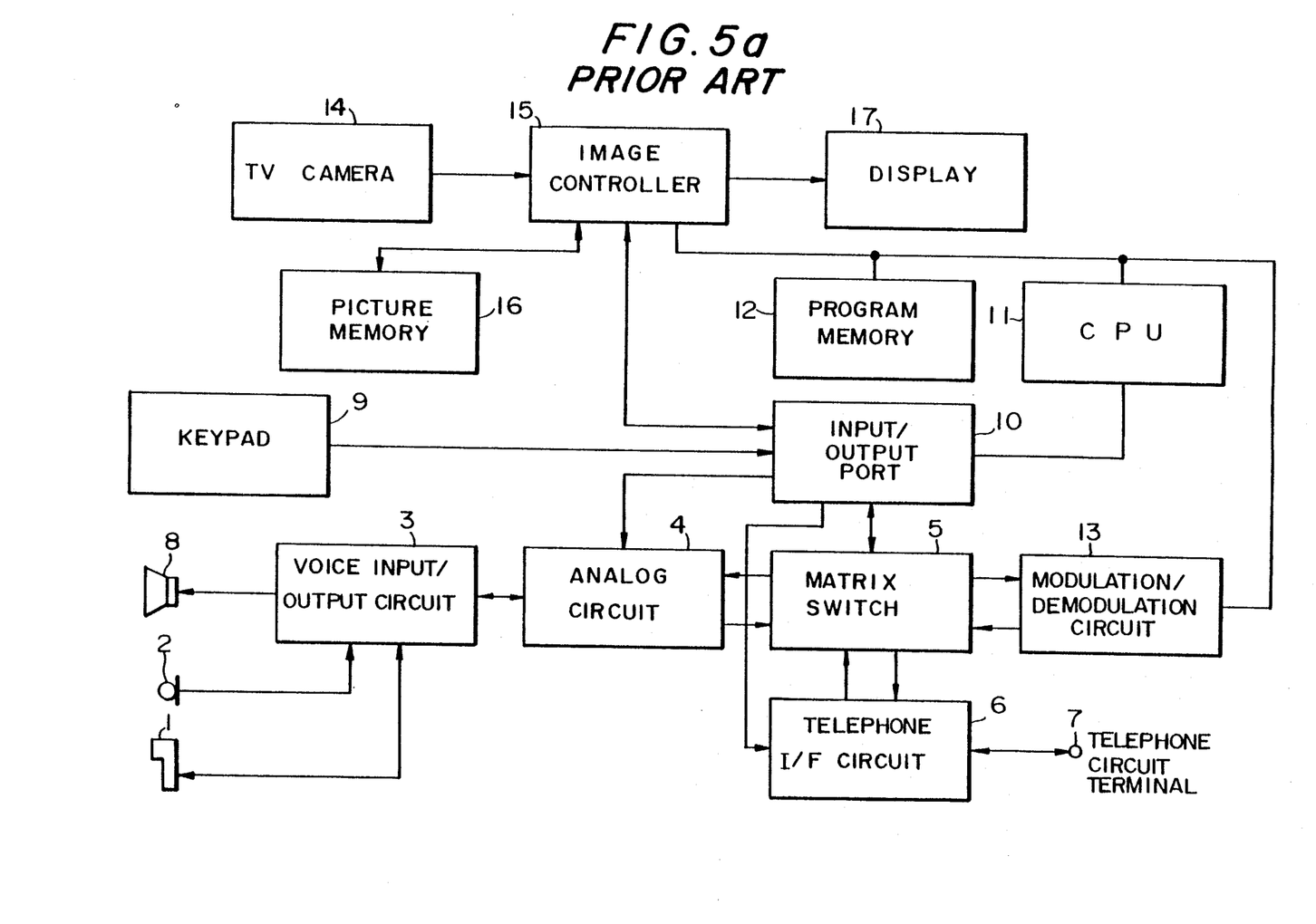
FIG. 5(a) is a block diagram showing a conventional still-picture TV telephone system.

FIG. 5(a) of the accompanying drawings is a circuit diagram showing this kind of monochrome still-picture TV telephone disclosed in "Telephone Engineer & Management" issued June 15, 1986.

In FIG. 5(a), reference numeral 1 designates a handset; 2, a microphone; 3, a voice input/output circuit; 4, an analog circuit; 5, a matrix switch; 6, a telephone interface circuit; 7, a telephone circuit terminal; 8, a speaker; 9, a keypad; 10, an input/output port; 11, a CPU; 12, a program memory; 13, a modem circuit; 14, a TV camera; 15, an image controller; a picture memory; and 17, a display.

Figure 5B:
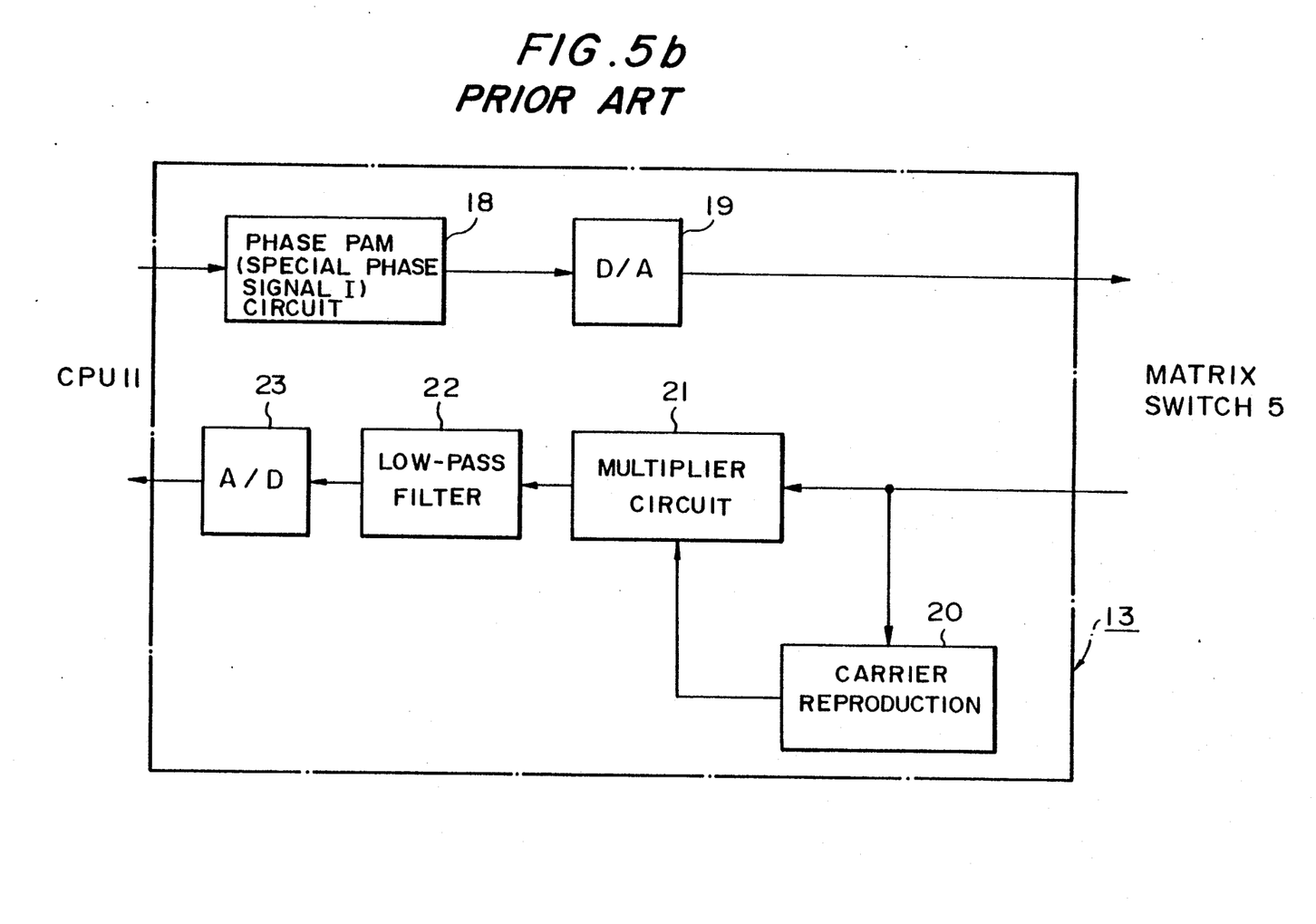
FIG. 5(b) is a block diagram showing a modem circuit of the conventional system.

FIG. 5(b) is a block diagram showing the modem circuit 13 of FIG. 5(a). In FIG. 5(b), reference numeral 18 designates a phase/amplitude modulation circuit; 19, a D/A converter; 20, a carrier reproduction circuit; 21, a multiplier; 22, a low-pass filter; and 23, an A/D converter.

Figure 6:
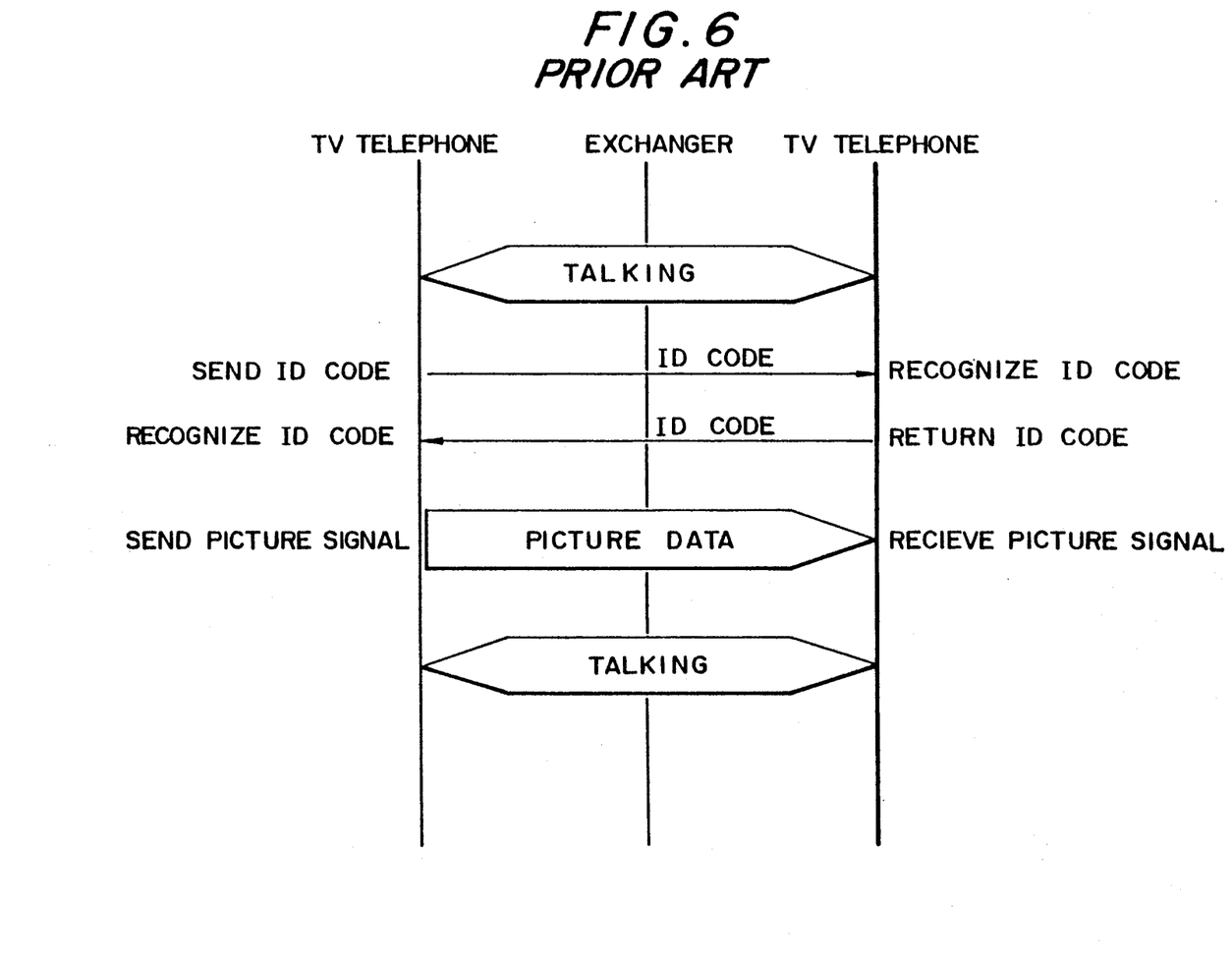
FIG. 6 is a sequence diagram showing the transmitting procedures of the conventional system.

FIG. 6 is a sequence diagram showing the picture transmitting procedures of the TV telephone of FIGS. 5(a) and 5(b).

The manner of transmitting the voice and picture signals in the conventional TV telephone will now be described with reference to FIGS. 5(a), 5(b), 6 and 7.

In FIG. 5(a) and 5(b), firstly during talking in voice over the telephone, a voice signal of the speaker is received by the handset 1 or the microphone, and its output is sent from the voice input/output circuit 3 to the analog circuit 4. The output of the analog circuit 4 is transmitted to the telephone circuit terminal 7 via the matrix switch 5 and then the telephone interface circuit 6. Further, the voice signal from a person at the other end of the line is reproduced by the handset 1 or the speaker 8 as it is transmitted to the handset 1 or the speaker 8 along the reverse path.

Meanwhile, in transmitting the still picture signal during talking, before transmission of picture data, as shown in FIG. 6, an ID code is sent to ascertain whether the telephone at the other end of the line is a TV telephone of the same data type, and then the picture data are transmitted after ascertaining the return of an ID code from the telephone at the other end of the line.

Specifically, as the speaker makes a command to transmit a picture by operating the keypad 9 in FIGS. 5(a) and 5(b), the CPU 11 detects this command via the input/output port 10 to supply an ID code to the modem circuit 13 according to a program stored in the program memory 12 beforehand. After having modulated to an analog signal in the modem circuit 13, the ID code is transmitted to the telephone at the other end of the line from the telephone circuit terminal via the matrix switch 5.

Likewise, an ID code from the telephone at the other end of the line is transmitted, along the reverse path, to the CPU 11 which ascertains the ID code.

During that time, the picture taken by the TV camera 14 is quantized in the image controller 15 and is stored temporarily in the picture memory 16, whereupon the quantized data are gradually introduced to and displayed on the display 17 and then are outputted, in response to a command of the CPU 11, to the telephone circuit terminal 7 from the picture memory In the presence of an ID code or picture data inputted from the telephone at the other end of the line, the matrix switch 5 switches by the carrier signal the direction in which the received signal from the telephone interface circuit 6 is to be transmitted, from the analog circuit 4 when received the voice signal, to the modem circuit 13.

After the received signal has been demodulated in the modem circuit 13, the CPU 11 returns the ID code or stores the data of the picture memory 16, and the image controller 15 gradually introduces the speaker's picture data and those of a person at the other end of the line to the display 17 which then displays the data.

In the absence of any carrier signal from the modem circuit 13 upon termination of transmitting and receiving the picture, the matrix switch 5 again connects the telephone interface circuit 6 and the analog circuit 4 to each other to return to the mode of talking in voice.

In the modem circuit 13 shown in FIG. 5(b), the picture is modulated in the following manner: The digital picture signal transmitted from the CPU 11 is modulated, by the combination of phase and amplitude of sixteen steps shown in FIG. 7, into a signal having a phase and an amplitude which correspond to the brightness of the picture signal.

This modulated signal is then supplied, as an analog signal, to the matrix switch 5 by the D/A converter 19.

Meanwhile, upon receipt of the picture signal, the analog picture signal supplied to the modem circuit 13 via the telephone interface circuit 6 and the matrix switch 5 is supplied to the multiplier circuit 21. At the same time, the modulated carrier signal is taken out from the analog picture signal in the carrier reproduction circuit 20. Then the modulated carrier signal is supplied to the multiplier 21 where the carrier signal is multiplied by the analog picture signal to perform the demodulating action eliminating the carrier component.

The picture signal thus devoid of the carrier signal is restricted in band by the low-pass filter 22 and is then supplied, as a digital signal, from the A/D converter 23 to the CPU 11.

Figure 7:
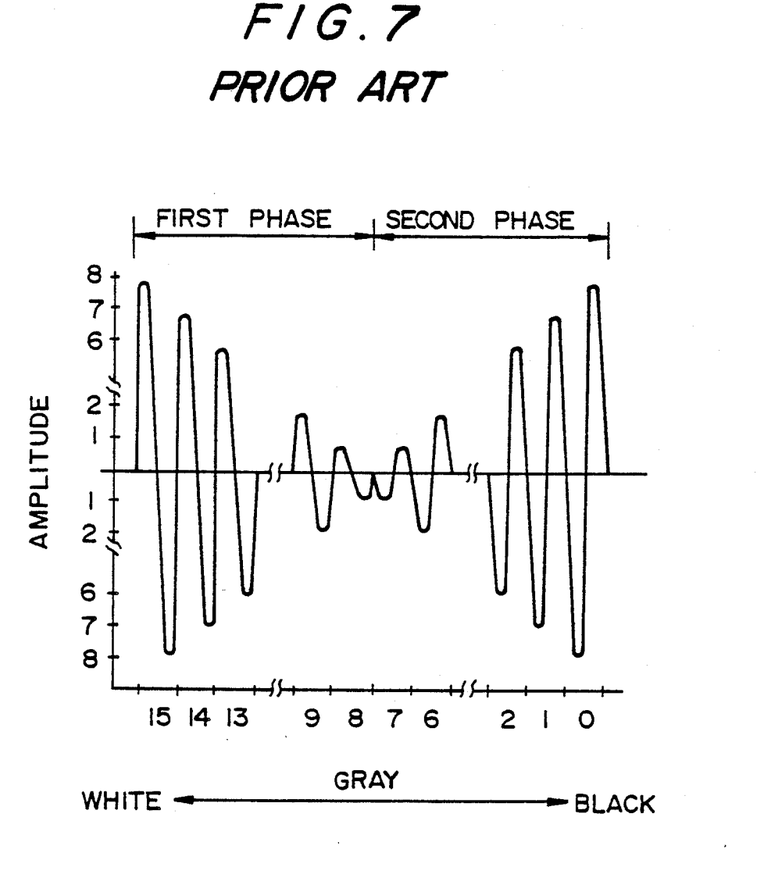
FIG. 7 is a diagram showing waveforms of a picture signal modulated in phase and amplitude in the conventional system.

According to this conventional system, the picture data are modulated into a picture signal in the following manner: As shown in FIG. 7, there are two phases: a first phase of sine curve type, and a second phase of −sine type different by 180° from the first phase, each of the first and second phases being composed of signals having a plurality of amplitudes.

Further, the particular phase and the particular amplitude of one cycle of signal correspond to respective particular brightnesses. In the illustrated example, each phase is eight cycles, i.e., sixteen cycles in total. As is apparent from FIG. 7, the signal "15" of the maximum amplitude of the first phase corresponds to white, and the signal "0" of the maximum amplitude of the second phase corresponds to black. The intermediate signals "14" to "1" correspond to gray of respective brightnesses.

Figure 8:
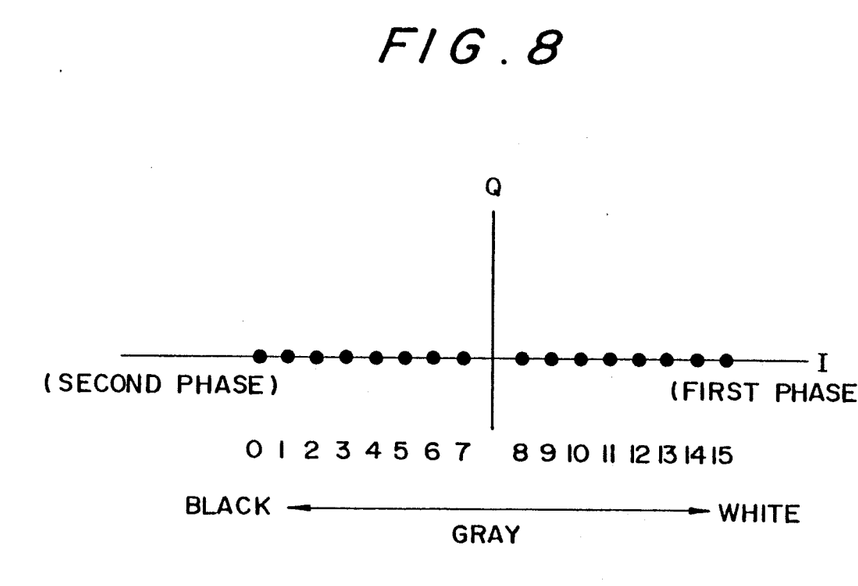
FIG. 8 shows the points of a modulated picture signal in the conventional system.

The arrangement of signal points on amplitude and phase planes at that time is shown in FIG. 8.

As described above, a still picture can be transmitted and received during ordinary talking in voice, and hence a mutual understanding at high level can be achieved.

However, in the conventional transmission system for still-picture TV telephone, as is apparent from the sequence diagram of FIG. 6, communication in voice and communication of picture data cannot coexist timewise. When transmitting the picture signal, communication in voice must be temporarily stopped; therefore, smooth and comfortable talking is difficult to achieve.

For example, in the case the picture has a screen size of 160 H×100 V picture elements, communication in voice must be stopped for about ten seconds to transmit one picture at a baud rate of 1747.82 Hz. Further, in the system of a high-resolution of 320 H×200 V picture elements, communication in voice must be stopped for four times longer than the above time. In the case of a color picture of the above resolution, communication in voice must be stopped for about 1.5 times longer than the above time.

SUMMARY OF THE INVENTION

It is therefore an object of this invention to provide a transmission system, for a still-picture TV telephone, in which communication in voice is possible even during communicating a picture signal.

According to this invention, there is provided a still-picture TV telephone system for transmitting and receiving, via a telephone circuit, a still picture taken by a TV camera, comprising: a voice band filter means for eliminating a special band signal of a voice signal introduced from a transmitting means; a low-pass filter means for restricting a still picture signal in band, cut-off frequencies of the low-pass filter means being set to less than or equal to ½ of the restricted band of the voice band filter means; a phase/amplitude modulation means for modulating the phase and amplitude of the still picture signal, high frequency components of which have been eliminated, by a carrier signal, frequencies of the carrier signal being set to substantially central frequencies of the signal-free band of the voice band filter means, baud rate frequencies being set substantially to the restricted band width of the voice band filter means; and a composer means for composing a picture transmission signal of modulated phase and amplitude in the narrow band and a voice transmission signal of the restricted band to divide frequency bands of the picture and voice signals and, at the same time, to transmit the picture and voice signals.

With this arrangement, since the signal band of the telephone circuit is used as divided into the band for picture signal and the band for voice signal, simultaneous transmission of voice and picture is possible. Further, since the picture signal is restricted in band by the base band, the system does not require a band-pass filter of high precision for restricting and separating the band of the picture signal.

The above and other advantages, features and additional objects of this invention will be manifest to those versed in the art upon making reference to the following detailed description and the accompanying drawings in which a preferred structural embodiment incorporating the principles of this invention is shown by way of illustrative example.

DETAILED DESCRIPTION

Figure 1A:
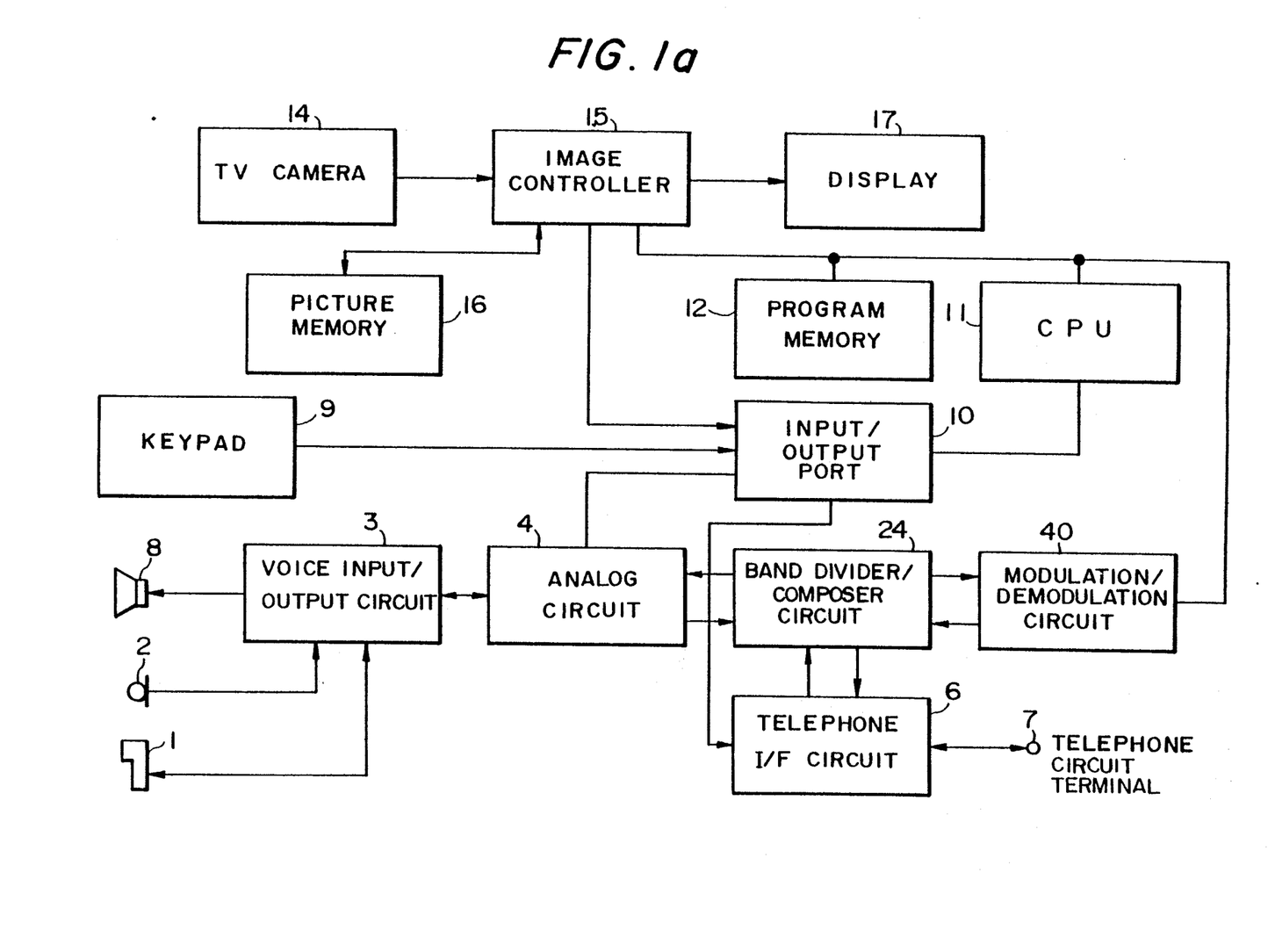
FIG. 1(a) is a block diagram showing a still-picture TV telephone system according to a preferred embodiment of this invention.
Figure 1B:
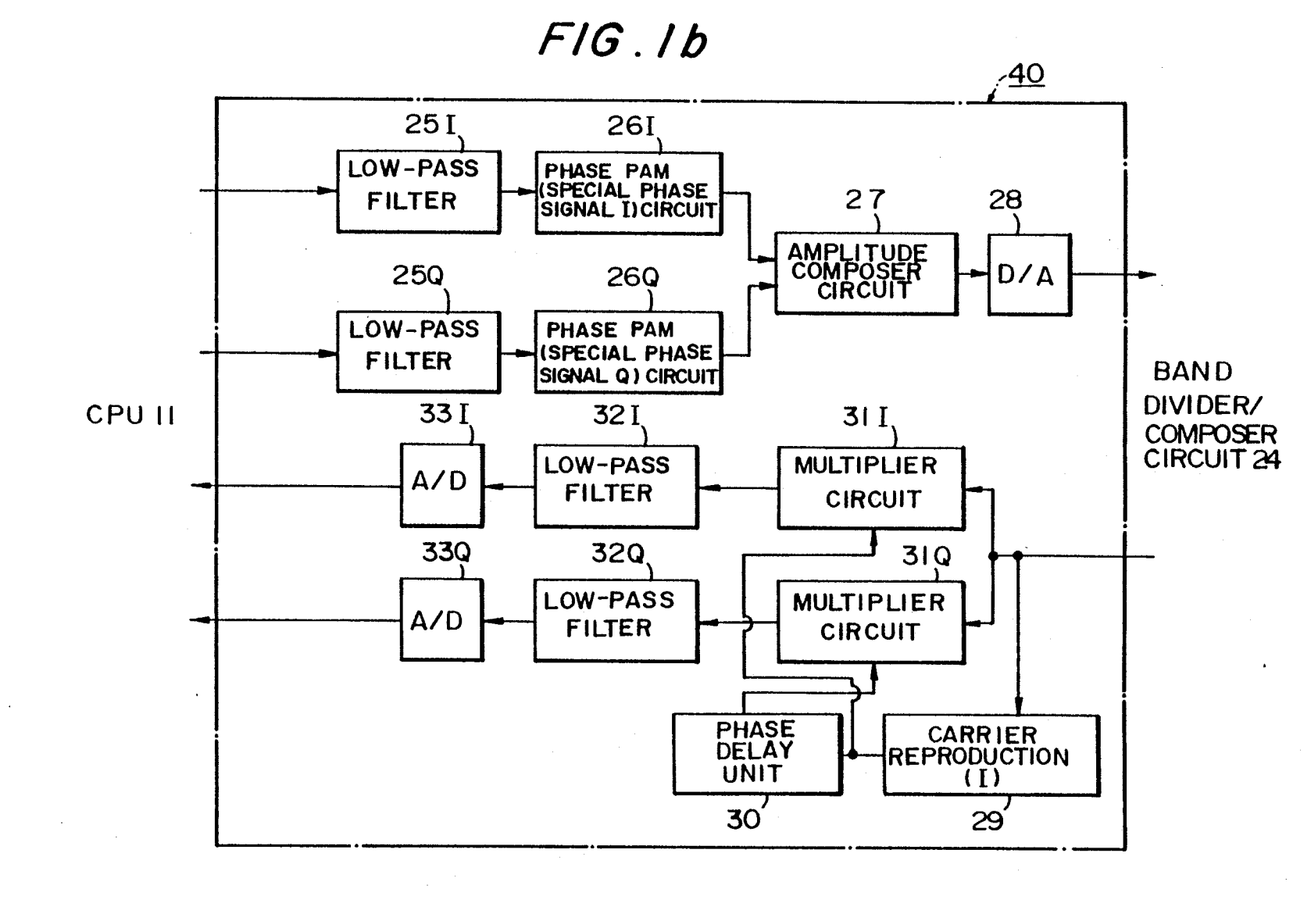
FIG. 1(b) is a block diagram showing a modem circuit 40 of the system of FIG. 1(a)
Figure 1C:
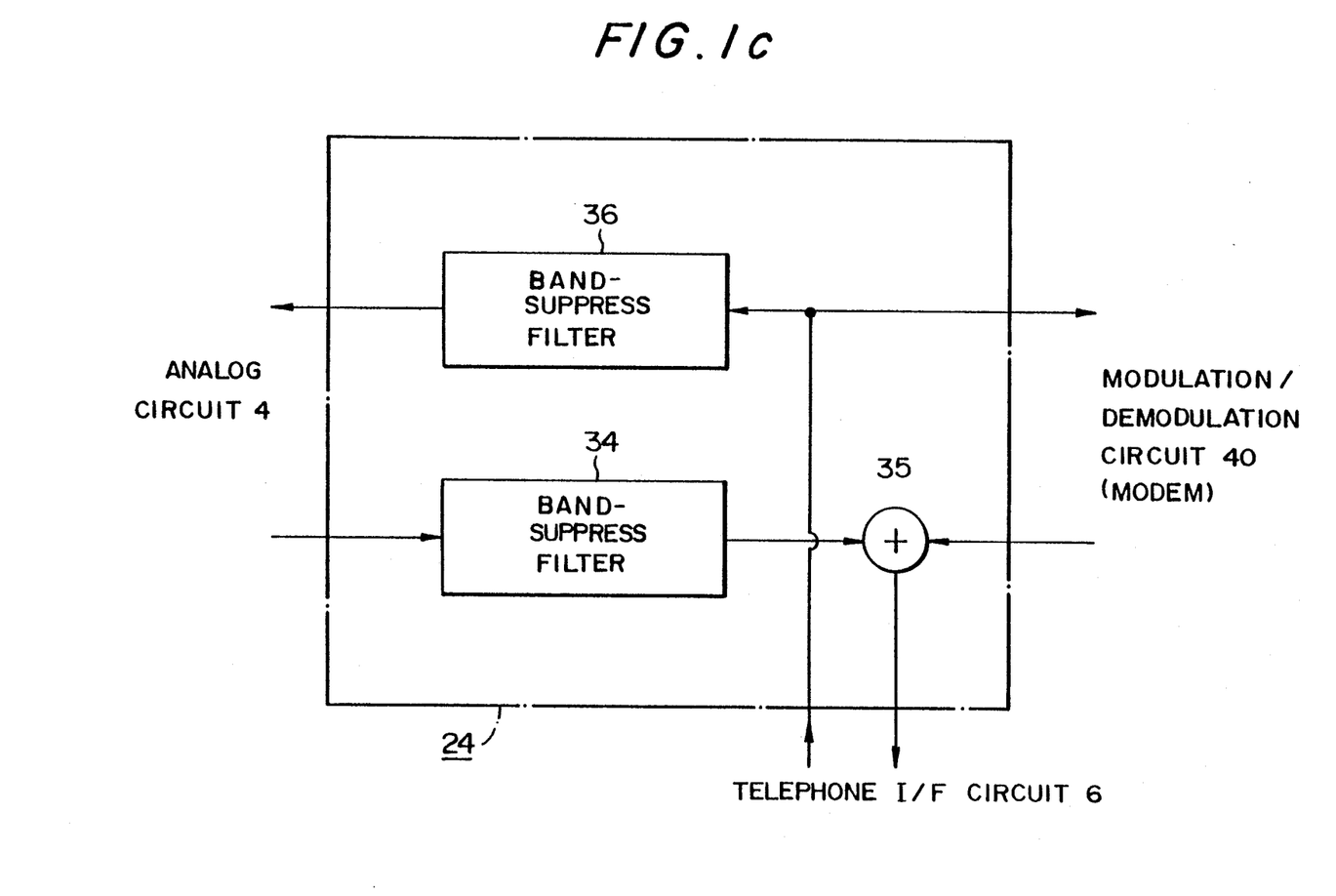
FIG. 1(c) is a block diagram showing a band divider/composer circuit of the system of FIG. 1(a)

The principles of this invention are particularly useful when embodied in a transmission system, for a still-picture TV telephone, such as shown in FIG. 1(a). FIGS. 1(b) and 1(c) shows a modem circuit 40 and a band divider/composer circuit 24, respectively of the system. Like reference numberals designate similar parts throughout this embodiment of FIGS. 1(a) and 1(b) and the conventional system of FIGS. 5(a) and 5(b).

For a significant feature of this invention, a simultaneous transmission of voice and picture is possible by dividing voice and picture signals in band, and a highspeed picture transmission can be realized by perpendicular amplitude modulation.

The system of this invention is characterized in that a picture signal is offered in a part of the frequency band using for a voice signal and also that the two signals are transmitted simultaneously. Further, the system is characterized in that the band in which the picture signal is to be offered is selected to a band in which picture data and voice data are hardly deteriorated in quality.

Figure 4A:
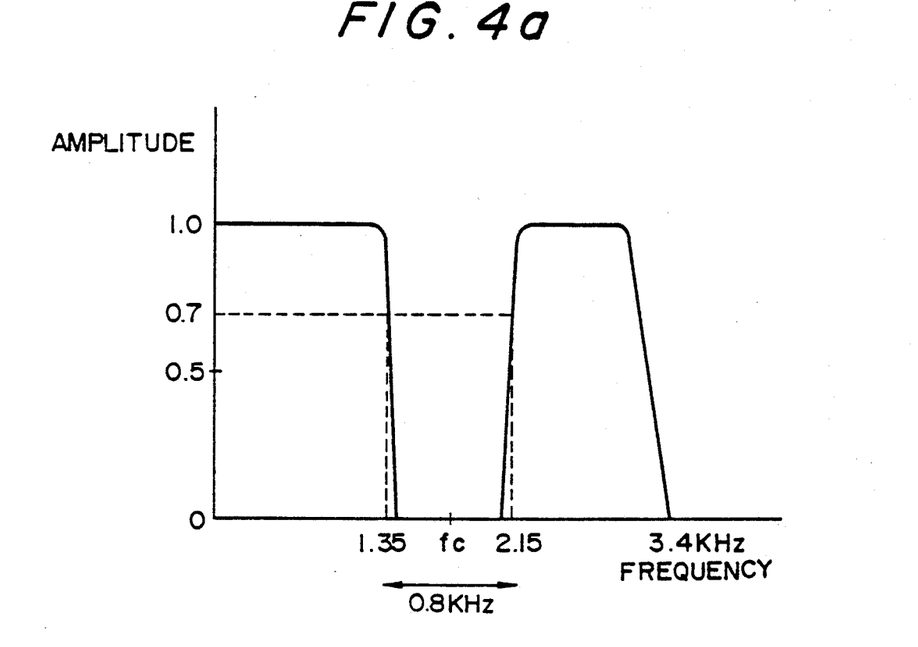
FIG. 4(a) is a graph showing the characteristic of a filter for filtering a voice signal in the system of FIG. 1(a)

FIG. 4(a) shows that there is a gap in a voice signal band having a width to ordinarily 3.4 kHz, the gap spanning 0.8 kHz around a carrier frequency fc which modulates a picture signal in phase and amplitude. This gap is formed by a filter characteristic, preferably a low-pass filter characteristic as steep as possible, of the voice signal.

Accordingly, in the illustrated embodiment, the voice signal has the cut-off frequency ranging from 1.35 to 2.15 kHz, in which the picture signal can be offered.

As described below, in the actual acoustic sense, the user can recognize a voice comfortably, without a substantial deterioration of voice quality, as he/her hears only low and high frequency components at the opposite sides of the suppressed intermediate band.

For selecting such band, the carrier frequency fc for modulating the picture signal in phase and amplitude must be selected to an experimentally optimum value. In this embodiment, with the carrier frequency fc of 1747.82 Hz conventionally in use, an adequate voice hearing action can be obtained.

In the meantime, since the picture signal is put in the band devoid of voice signal in FIG. 4(a) to divide the bands for the voice and picture signals, the spectrum of the modulated picture signal must be restricted to a band corresponding to the voice-signal-free band.

It is a common knowledge that the spectrum of the signal modulated in phase and amplitude depends on the baud rate during the phase/amplitude modulation so that the resulting band is substantially equal to the baud rate frequency.

In the embodiment, each of phase/amplitude modulator circuits 26I, 26Q of a modem circuit 40 is selected to the baud rate frequency of 582.6 Hz, adequately narrow compared to 0.8 kHz of the voice-signal-free band of FIG. 4(a).

Figure 3A:
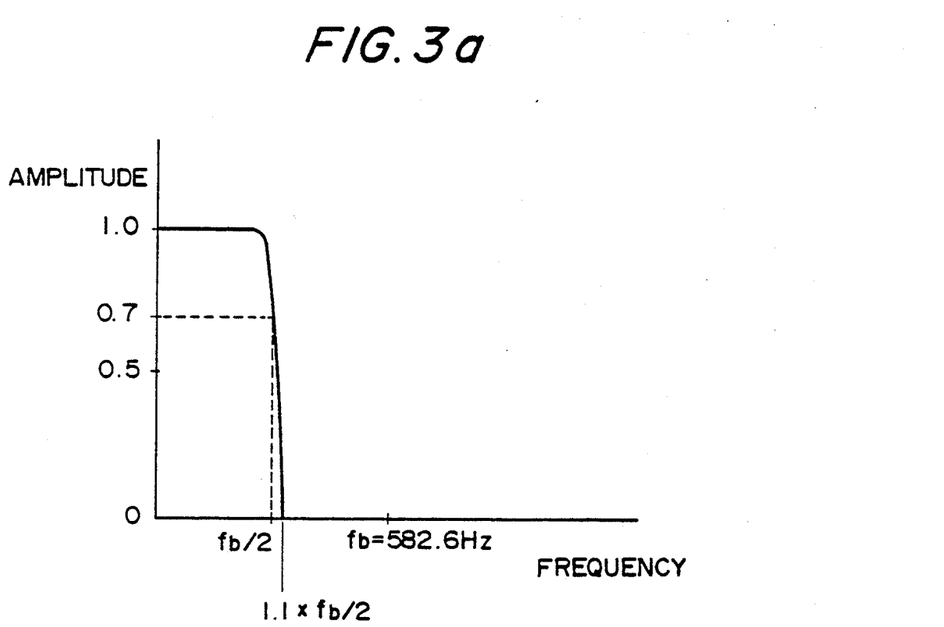
FIG. 3(a) is a graph showing the characteristic of a low-pass filter for filtering a picture signal in the system of FIG. 1(a)
Figure 3B:
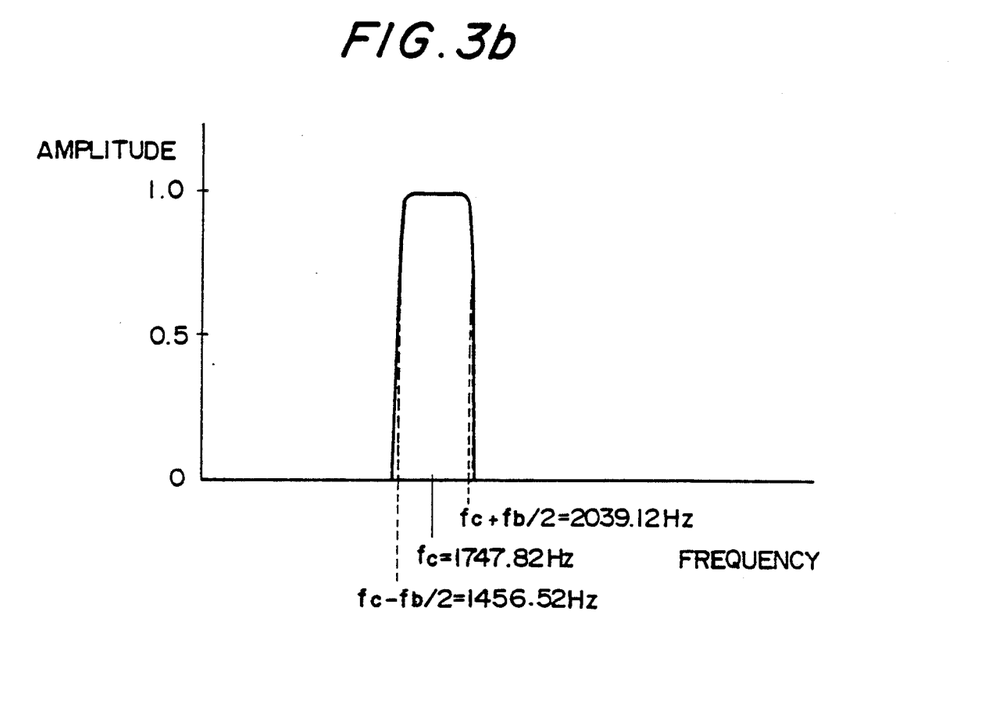
FIG. 3(b) shows the spectrum of a picture signal having been modulated in phase and amplitude in the system of FIG. 1(a)

FIG. 3(b) shows the spectrum of this picture signal; assuming that the carrier frequency fc for phase/amplitude modulation is 1747.82 Hz and that the baud rate frequency fb is 582.6 Hz, the resulting band ranges from 1456.52 Hz to 2039.12 Hz. Accordingly, the spectrum of the picture signal of FIG. 3(a) can be divided in band and put in the voice-signal-free band of FIG. 4(a).

According to this invention, to restrict the modulated base band frequency within a low band in response to the restriction of the baud rate during phase/amplitude modulation, the modem circuit 40 has low-pass filters 25I, 25Q. The resulting cut-off frequency is set to a half the baud rate frequency, i.e. 291.3 Hz.

By this filter action, the base band frequency modulated in phase is restricted to such a band as to be accommodated in the spectrum of FIG. 3(b). As the result of the filter action and of the baud rate setting, the band of the final picture signal can be restricted during phase-/amplitude modulation.

In the embodiment, the baud rate frequency fb can be set at option so as to be divided in band. Assuming that it is set to 1/n (n is a integer) of the carrier frequency fc modulated in phase and amplitude, it is advantage that such baud rate frequency fb can be easily obtained by a simple frequency divider circuit.

In the embodiment, it is set that fb=⅓ fc; alternatively, the baud rate frequency may be set optionally in relation to the voice-signal-free band.

Due to this lowered baud rate, the picture signal is modulated in phase and amplitude at a low rate. The voice can be transmitted simultaneously with the picture, thus occasionally causing an increased transmitting time for the picture.

This problem is avoided by perpendicular amplitude modulation. In the conventional system, as shown in FIGS. 7 and 8, only sine signals are used for the modulating signals. In the embodiment, cosine signals, in addition to the sine signals, are used; signals of two system is modulated in phase simultaneously and in parallel by a signal different in phase by 90°. At the same time, the signals can be demodulated, and the sine and cosine signals different in phase by 90° can be modulated and demodulated independently without interference with each other, so that the phase/amplitude modulations can be conducted at a two-fold rate to recover any delay in baud rate.

The modulating/demodulating action will be described as follows:

As shown in FIG. 1(b), the modulator of the modem circuit 40 includes a pair of low-pass filters 25I, 25Q to which picture signals of two line components of the picture which are transmitted to the CPU 11 in parallel. In the illustrated example, the low-pass filters 25I, 25Q each have a steep roll-off characteristic of FIG. 3(a). In FIG. 3(a), fb represents the baud rate frequency, which is here set to ⅓ of the carrier frequency fc =1747.82 Hz while the cut-off frequency of either low-pass filter 25I, 25Q is also set to fb/2=291.3 Hz.

The band-restricted outputs of the low-pass filters 25I, 25Q are connected to the respective phase/amplitude modulation circuits 26I, 26Q. The former receives a low-pass signal as the output signal of the low-pass filter 25I, modulates the signal in phase and amplitude by a special phase signal I of 0° phase (sine), and outputs an I phase/amplitude-modulated signal. The latter receives a low-pass signal as the output signal of the low-pass filter 25Q, modulates the signal in phase and amplitude by a special phase signal Q of 90° phase (cosine), and outputs a Q phase/amplitude-modulated signal. The output signals of the two phase/amplitude modulation circuits 26I, 26Q are composed in amplitude in an amplitude composer circuit 27, and the amplitude-composed signal I+Q is transmitted to a D/A converter 28, whereupon its digital data are converted to an analog signal.

The signals processed simultaneously and in parallel are two-line signals of the picture memory 16; by this perpendicular process, picture data of a picture can be processed in parallel at a two-fold rate.

Meanwhile, the demodulator of the modem circuit 40 extracts the I phase/amplitude-modulated signal and the Q phase/amplitude-modulated signal from the amplitude-composed signal I+Q transmitted reversely from the telephone at the other end of the line, thus performing the demodulating action.

Namely, as a circuit for extracting and demodulating the I phase/amplitude-modulated signal, a carrier reproduction circuit 29 for detecting a specified phase I is provided An analog multiplication of the special phase signal I from the carrier reproduction circuit 29 and the received signal is conducted in a multiplier circuit 31I.

The low band of the multiplication signal outputted from the multiplier circuit 31I is filtered in a low-pass filter 32I having a roll-off characteristic of FIG. 3(a), and then the filtered signal is digitized by an A/D converter circuit 33I.

As a circuit for extracting and demodulating the Q phase/amplitude-modulated signal, a phase delay circuit 30 for delaying the output of the carrier reproduction circuit 29 by 90° is provided. An analog multiplication of the special phase signal Q from the phase delay circuit 30 and the received signal is conducted in a multiplier circuit 31Q. The low band of the multiplication signal outputted from the multiplier circuit 31Q is filtered in a low-pass filter 32Q having a roll-off characteristic of FIG. 3(a), and then the filtered signal is digitized by an A/D converter circuit 33Q.

Here, the low-pass filter for restricting the band should preferably has the following cosine roll-off characteristic, for example.

Considering a gain $A(\omega)$:

if $|\omega| < (\pi/T)(1 - \alpha), A(\omega) = 1;$ if $||\omega| - (\pi/T)| < (\pi/T)\alpha,$ $\cos(T/4\alpha)(|\omega| - (\pi/T)(1 - \alpha));$ and if $|\omega| > (\pi/T)(1 + \alpha), A(\omega) = 0;$ where T stands for an inverse number of the modulated frequency of the picture signal, $\alpha$ stands for a positive number equal to or less than 1, and $\omega$ stands for an angular frequency.

The operation of the band divider/composer circuit will now be described.

As shown in FIG. 1(c), the transmitting part of the band divider/composer circuit includes a band-suppress filter 34 for receiving the voice signal from the analog circuit 4 and for filtering the voice signal by the characteristic of FIG. 4(a), and an amplitude composer circuit 35 for composing the filter output signal and the picture signal from the modem circuit 35 and for outputting the resulting composite signal to the telephone interface circuit 6.

The receiving part of the band divider/composer circuit is connected to the input of the modem circuit 40, remaining the received signal from the telephone interface circuit 6, and includes a band-suppress filter 36 for filtering the received signal by the characteristic of FIG. 4(a) and for outputting the resulting signal to the analog circuit 4.

Figure 2:
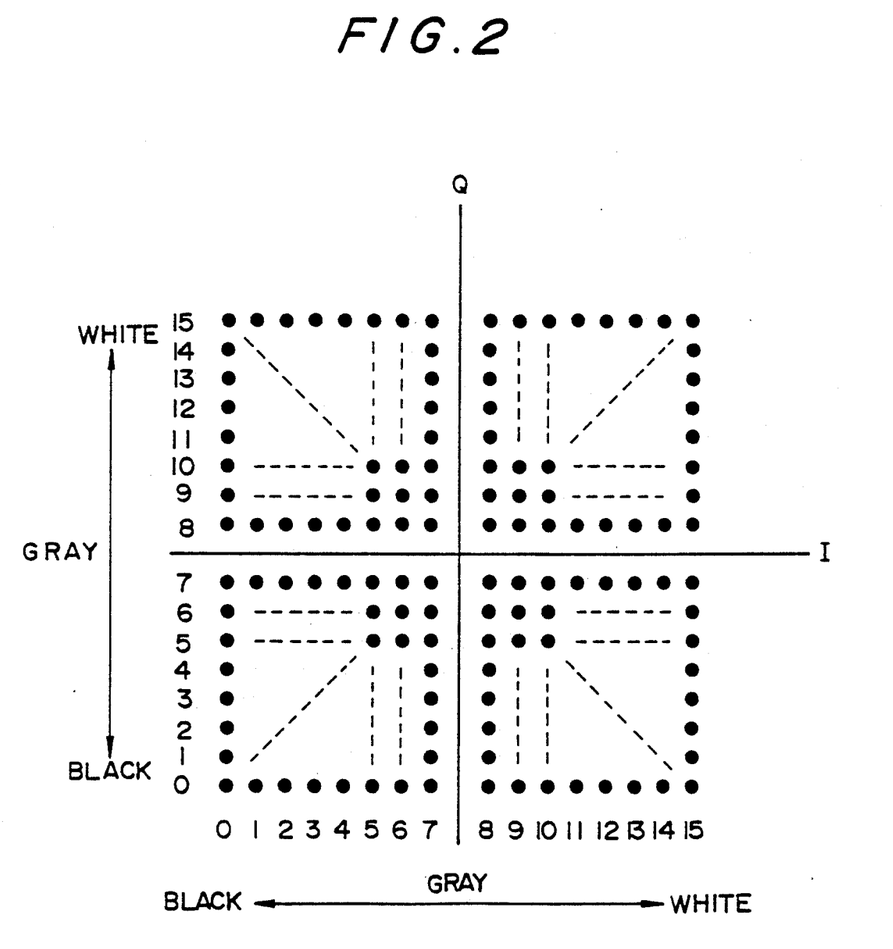
FIG. 2, shows the arrangement of signal point of picture signal when modulating the picture signal perpendicularly in the system of FIG. 1(a)

In the embodiment, the arrangement of signal points using in modulation is a perpendicular two-dimensional form as shown in FIG. 2; thus it is called a 16×16-value perpendicular amplitude modulation system.

For example, the signal points of 0° phase are sixteen, and the signal points of 90° are sixteen; even when the voice and picture signals are processed simultaneously, it is possible to separate and demodulate the signal with ease.

The picture signal taken by the TV camera 14 is quantized in the image controller 15 and is stored in the picture memory 16. The signal temporarily stored in the picture memory 16; the two lines, upper and lower lines, of the picture signals stored by the action of control of the CPU 11 are successively supplied, as the signal for I phase modulation and the signal for Q phase modulation, to the modem circuit 40.

In other words, the first line of picture signal and the second line of picture signal are simultaneously modulated as the signal for I phase modulation and the signal for Q phase modulation. Subsequently the third and fourth lines of picture signals are likewise processed This procedure is repeated up to the final line.

In transmission of data at that time, the signal for I phase modulation and the signal for Q phase modulation are transmitted in parallel at the baud rate frequency, i.e., fb=⅓×1747.82 Hz.

Meanwhile, the signal for I phase modulation and the signal for Q phase modulation are filtered by the characteristic of FIG. 3(a), in the respective low-pass filters 25I, 25Q. Therefore, the spectrum band modulated in phase and amplitude is restricted to this fb, i.e., 582.6 Hz.

As a result, the two signals are restricted in band. It is preferably to restrict the band to ½ of the baud rate frequency fb in order for introducing the signals with maximum efficiency. For this reason, in the embodiment, the cut-off frequency of each low-pass filter 25I, 25Q is set to 291.3 Hz. These signals are modulated by the carrier of frequency fc (=1747.82 Hz), i.e. the special phase signal I and the special phase signal Q perpendicular thereto in the respectively phase/amplitude modulation circuits 26I, 26Q. Thus the I phase/amplitude-modulated signal and the Q phase/amplitude-modulated signal, which have the spectrum distribution shown in FIG. 3(a), have been obtained.

Here in this embodiment, since the carrier frequency fc is n times (n is an integer), e.g., three times the baud rate frequency fb, the low-pass process and the modulation (multiplication with the carrier) process can be done synchronously with each other, it is possible to make the system construction very simple.

The two phase/amplitude-modulated signals are composed in amplitude in the amplitude composer circuit 27; this spectrum distribution is similar to that of FIG. 3(b).

The output signal from the amplitude composer circuit 27 is analog-converted in the D/A converter 28, and is then outputted to the telephone circuit terminal 7 via the band divider/composer circuit 24 and the telephone interface circuit 6.

Therefore according to the modem circuit 40 of this invention, since the two lines of picture signals are processed simultaneously, the two-fold transmitting rate is obtained. In the meantime, the picture signals are modulated at the baud rate frequency fb=⅓ fc (in the conventional system, the baud rate is equal to the carrier frequency fc), the process rate is ⅓, and the composed picture signals can be transmitted, even during talking in voice, for about 3/2 time, compared to the conventional system.

Now the receiving of the picture signal will be described.

Also here, the voice signal, like in transmitting, is not superposed.

The amplitude-composed signal I+Q received via the telephone circuit is inputted to the modem circuit 40 via the telephone interface circuit 6 and the band divider/composer circuit 24.

The carrier signal of I phase of this inputted signal is reproduced in the carrier reproduction circuit 29 as the first input of the multiplier circuit 31I for the I phase signal.

On the one hand, since to the second input of the multiplier circuit 31I, the amplitude-composed signal I+Q having passed through the band divider/composer circuit 24 is inputted, the output of the multiplier circuit 31I, which output is obtained by analog-multiplying the first and second input signals, can be reproduced as the signal of a level equal to the signal for I phase modulation, at the transmitting side in the low-pass filter 32I having the low-pass characteristic of FIG. 3(a). Now since the carrier is perpendicular to the I phase carrier, i.e., the signal of the same frequency different by 90° in phase from the I phase carrier, the Q phase/amplitude-modulated signal component of the amplitude-composed signal I+Q will be zero in amplitude as multiplied by the I phase carrier.

On the other hand, the carrier signal of I phase as the output of the carrier reproduction circuit 29 is delayed 90° in phase in the phase delay circuit 30, and will be the carrier signal of Q phase, i.e., the first input of the multiplier circuit 31Q for Q phase signal.

Also to the second input of the multiplier circuit 31Q for Q phase signal, the amplitude-composed signal I+Q are inputted. Like the I phase signal, the output signal of the multiplier circuit 31Q, which signal is obtained by analog-multiplying the two input signals, is reproduced as the signal of a level equal to the signal for Q phase modulation at the transmitting side in the low-pass filter 32Q having the low-pass characteristic of FIG. 3(a).

Then, the reproduced signals for I phase and Q phase modulation are digitized by the respective A/D converter 33I, 33Q, and are stored in the picture memory 16 by the action of control of the CPU 11.

Subsequently, the image controller 15 reads the picture signal stored in the picture memory 16 and displays a still picture on the display 17.

As described above, the transmission/receiving of the picture signal and the transmission/receiving of the voice signal are conducted individually. In this invention, the transmission of the picture signal can be offered by the keypad 9 during transmitting the voice signal. Partly because the voice signal partially has a cut-off frequency band, and partly because the spectrum of the picture signal is restricted within the cut-off frequency band of the voice signal, it is possible to compose these two signals and to separate them in band.

In other words, the voice signal is supplied to the band divider/composer circuit 24 from the handset 1, or the microphone 2, via the voice input/output circuit 3 and the analog circuit 4. The voice signal is suppressed, in band for transmitting the picture signal, by the band-suppress filter 34 and is composed in band with the modulated picture signal components by the amplitude composer circuit 35, whereupon the resulting composite signal is transmitted to the telephone circuit terminal 7 via the telephone interface circuit 6.

The voice signal from the telephone at the other end of the line is transmitted, along the reverse path, to the band divider/composer circuit 24 via the telephone circuit terminal 7 and the telephone interface circuit 6. Now after the picture signal component superposed in the transmission circuit by the band-suppress filter 36 having the characteristic of FIG. 4(a), the voice signal is reproduced by the handset 1, or the speaker 8, via the analog circuit 4 and the voice input/output circuit 3.

The voice signal to be reproduced at that time is suppressed in band spanning 0.8 kHz around the picture signal transmitting carrier frequency fc=1747.82 Hz of FIG. 4(a). However, as disclosed in a paper issued March in 1982 under the title "Research Report On Administrative Audiography" from Telecommunication System Research Committee, Telecommunications Administration Office, Ministry of Posts and Telecommunications, the Government of Japan, the amount of quality deterioration with respect to the degree of clearness is about −3 dB, which is very small and hence negligible. Namely, in this report, the frequency bands through which voice passes and which seem to have substantially the same band characteristic are 0–1.3 kHz and 2.1–3.4 kHz; that is, the mean value of the voice clearness is 85.5%. This value is only about 8% lower, compared with about 94% in normal condition when the band is not suppressed.

The effects on receiving the picture signal when the voice signal is superposed during transmitting the picture signal will now be described.

Figure 4B:
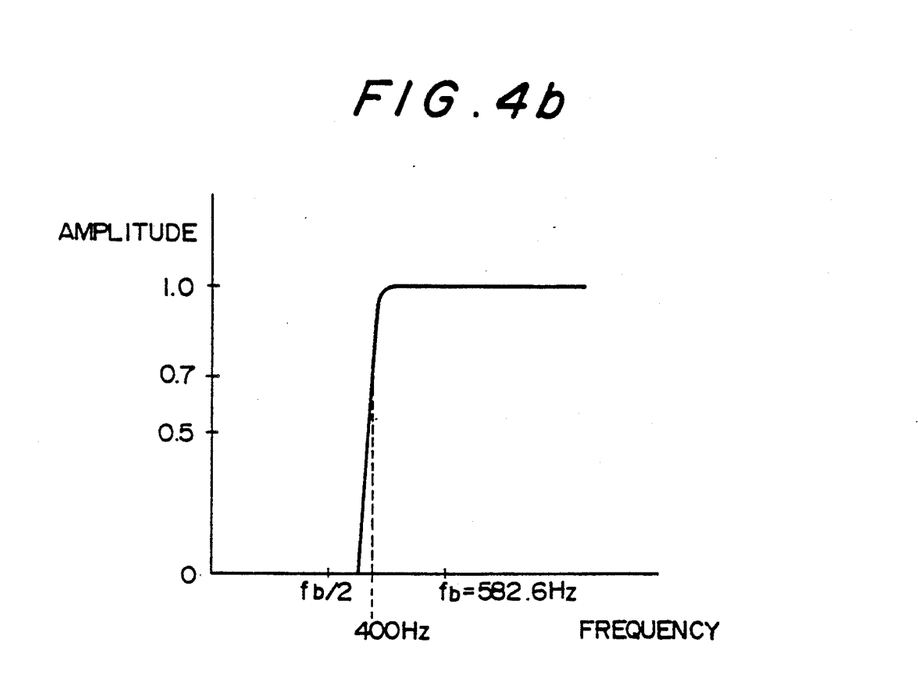
FIG. 4(b) shows the frequency spectrum of a picture signal having been mixed with a carrier signal in a demodulation circuit upon receipt of a voice signal in the system of FIG. 1(a)

Since the voice signal is filtered in the band-suppress filter 34 having the characteristic of FIG. 4(a) and is then transmitted to the telephone circuit, the signal components are multiplied by the carrier of frequency fc=1747.82 Hz in the multipliers 31I, 31Q of the modem circuit 24 and are shifted to the band of over 400 Hz of FIG. 4(b).

Further, since this signal is filtered by the characteristic of FIG. 3(a) in the low-pass filters 32I, 32Q of the next stage, its components of the signal are all suppressed so that the output from the filters are only the components of the picture signal, thus causing no effect or influence on the reproduction of the picture signal.

In the illustrated embodiment, the baud rate frequency of the picture signal is set to $\frac{1}{3}$ of the carrier frequency fc. Alternatively, the baud rate frequency may be smaller to reduce a desired band of the picture signal so that the voice band to be suppressed can be minimized so as not to deteriorate the voice quality over the telephone. Reversely, the baud rate may be increased to minimize the transmitting time of the picture, at only a small sacrifice of the voice quality.

According to the system of this invention, since the picture signal and the voice signal are transmitted as divided in band, it is possible to continue communication in voice even during transmitting the picture signal. Further, since the picture signal is modulated in phase and amplitude after passed through the band-restricting low-pass filters, any band-pass filter conventionally used such as in audiography would be unnecessary, thus making the system simple in construction and hence inexpensive to manufacture.

What is claimed is:

1. A still-picture TV telephone system for transmitting and receiving, via a telephone circuit, a still picture taken by a camera, comprising:
   (a) a voice band filter means for eliminating a special band signal of a voice signal introduced from a transmitting means;
   (b) a low-pass filter means for restricting a still picture signal in band, cut-off frequencies of said low-pass filter means being set to less than or equal to $\frac{1}{2}$ of the restricted band of said voice band filter means;
   (c) a phase/amplitude modulation means for modulating the phase and amplitude of the still picture signal, high frequency components of which have been eliminated, by a carrier signal, frequencies of the carrier signal being set to substantially central frequencies of the signal-free band of said voice band filter means, a baud rate frequency being set substantially to the restricted band width of said voice band filter means; and (d) a composer means for composing a picture transmission signal of modulated phase and amplitude in the narrow band and a voice transmission signal of the restricted band to divide frequency bands of the picture and voice signals and, at the same time, to transmit the picture and voice signals.

2. A still-picture TV telephone system according to claim 1, wherein the baud rate frequencies of said phase-/amplitude modulation means is set to 1/n of the carrier signal frequencies, where n stands for an integer.

3. A still-picture TV telephone system according to claim 2, wherein the baud frequencies of said phase/amplitude modulation means is set to ½ of the carrier signal frequency.

4. A still-picture TV telephone system according to claim 1, wherein said low-pass filter means is a filter having a roll-off characteristic.

5. A still-picture TV telephone system according to claim 1, wherein said voice band filter means has a filter characteristic so as to leave both low and high frequency ranges of the voice signal.

6. A still-picture TV telephone system for transmitting and receiving, via a telephone circuit, a still picture taken by a camera, comprising:
(a) a voice band filter means for eliminating a special band signal of a voice signal introduced from a transmitting means;
(b) a low-pass filter means for restricting a still picture signal in band, cut-off frequencies of said low-pass filter means being set to less than or equal to ½ of the restricted band of said voice band filter means;
(c) a phase/amplitude modulation means for modulating the phase and amplitude of the still picture signal, high frequency components of which have been eliminated, by a carrier signal, frequencies of the carrier signal being set to substantially central frequencies of the signal-free band of said voice band filter means, a baud rate frequency being set substantially to the restricted band width of said voice band filter means; and
(d) a composer means for composing a picture transmission signal of modulated phase and amplitude in the narrow band and a voice transmission signal of the restricted band to divide frequency bands of the picture and voice signals and, at the same time, to transmit the picture and voice signals; and
(e) a receiver circuit for receiving a transmitted voice-and-picture composite signal and for separating the composite signal in band.

7. A still-picture TV telephone system according to claim 6, wherein said receiver circuit includes a voice separating band-pass filter having a filter characteristic similar to that of said voice band filter means.

8. A still-picture TV telephone system according to claim 6, wherein said receiver circuit includes a demodulator circuit composed of a multiplier circuit for mixing the received signal and the carrier signal, and a low-pass filter for eliminating the high frequency components of output of said multiplier circuit, said low-pass filter having a filter characteristic similar to that of said low-pass filter means.

9. A still-picture TV telephone system according to claim 8, further comprising a carrier reproduction circuit for separating the carrier signal from the received signal to obtain a carrier signal to be mixed in said demodulator circuit.

10. A still-picture TV telephone system for transmitting and receiving, via a telephone circuit, a still picture taken by a camera, comprising:
(a) a voice band filter means for eliminating a special band signal of a voice signal introduced from a transmitting means;
(b) a pair of low-pass filter means for restricting a still picture signal in band, cut-off frequencies of said low-pass filter means being set to less than or equal to ½ of the restricted band of said voice band filter means;
(c) an I phase/amplitude modulation means for modulating the phase and amplitude of the still picture signal, outputted from one of said pair of low-pass filter means, by a carrier signal of 0 degree phase, frequencies of the carrier signal being set to substantially central frequencies of the signal-free band of said voice band filter means, baud rate frequencies being set substantially to the restricted band width of said voice band filter means;
(d) a Q phase/amplitude modulation means for modulating the phase and amplitude of the still picture signal, outputted from the other low-pass filter means, by a carrier signal of 90 degree phase, frequencies of the carrier signal being set to substantially central frequencies of the signal-free band of said voice band filter means, a baud rate frequency being set substantially to the restricted band width of said voice band filter means; and
(e) an amplitude composer circuit for composing the modulated outputs of both said I and Q phase/amplitude modulation means; and
(f) a composer means for composing a picture transmission signal of modulated phase and amplitude in the narrow band and a voice transmission signal of the restricted band to divide frequency bands of the picture and voice signals and, at the same time, to transmit the picture and voice signals.

11. A still-picture TV telephone system according to claim 10, wherein the baud rate frequency of said phase-/amplitude modulation means is set to 1/n of the carrier signal frequencies, where n stands for an integer.

12. A still-picture TV telephone system according to claim 11, wherein the baud rate frequency of said phase-/amplitude modulation means is set to ½ of the carrier signal frequencies.

13. A still-picture TV telephone system according to claim 10, wherein said low-pass filter means is a filter having a-roll-off characteristic.

14. A still-picture TV telephone system according to claim 10, wherein said voice band filter means has a filter characteristic so as to leave both low and high frequency ranges of the voice signal.

* * * * *